3,093,547
PROCESS OF PREPARING PENICILLINS
Hans Margreiter, Radfeld, Tirol, and Richard Brunner and Ernst Brandl, Kundl, Tirol, Austria, assignors to Biochemie Gesellschaft mit beschraenkter Haftung, Kundl, Tirol, Austria, a corporation of Austria
No Drawing. Filed Nov. 23, 1960, Ser. No. 71,126
Claims priority, application Austria Nov. 24, 1959
18 Claims. (Cl. 195—36)

The present invention relates to a process of producing penicillins and more particularly to a process of biosynthetically producing penicillins by the addition of new and advantageous precursors to the fermentation medium.

In the biosynthetic preparation of penicillins, the generally adopted procedure is to introduce a specific radical in the side chain of the penicillin molecule by the addition of chemical compounds, so-called precursors, during the fermentation period, i.e. during the period of time between inoculation of the culture medium and separation of the mold mycelium from the fermentation broth. A process of this kind is described, for instance, in British Patent No. 643,514.

Some penicillins, such as, for instance (α-methyl)-phenoxy methyl penicillin, however, have not been produced heretofore by purely biosynthetic methods.

It is known, for instance, that precursor compounds which are derived from o-substituted phenyl acetic acids and phenoxy acetic acids, such as 2-chloro phenoxy acetic acid, 2-cresoxy acetic acid, 2-hydroxy phenyl acetic acid, 2-hydroxy phenoxy acetic acid, and 2-methoxy phenoxy acetic acid, could not be incorporated into the penicillin molecule by fermentative methods. Similar precursor compounds derived from m-substituted phenyl acetic acids and phenoxy acetic acids, such as 3-hydroxy phenoxy acetic acid and 3-nitro phenoxy acetic acid, could be incorporated only poorly and with a low yield.

It is one object of the present invention to provide a fermentation process in which, during fermentation and by the addition of a suitable precursor compound, not only already known penicillins, such as phenoxy methyl penicillin, p-cresoxy methyl penicillin, phenyl mercapto methyl penicillin, benzyl penicillin, and n-butoxy methyl penicillin are obtained in a high yield, but which process, surprisingly, permits to produce by fermentative methods penicillins which could not be obtained heretofore by submersed fermentation using *Penicillium notatum* or *Penicillium chrysogenum* or their mutants in the presence of conventionally used precursor compounds.

Other objects of the present invention and advantageous features thereof will become apparent as the description proceeds.

In principle the present invention has for its purpose the biosynthetic preparation of penicillins of the Formula I $$C_8H_{10}O_3NS—NH—Z_1—R_1—(X—R_2)_n \quad (I)$$

wherein $Z_1$ indicates a CO-group,
$R_1$ indicates a bivalent and, if required, substituted aliphatic hydrocarbon radical,
$X$ indicates a direct carbon to carbon bond, oxygen, or sulfur,
$R_2$ indicates an organic radical, preferably an aliphatic, alicyclic, araliphatic, aromatic, or heterocyclic radical, which may be substituted, and
$n$ indicates the integers 1 or 2, and the production of salts of these penicillins.

According to the present invention, it is now possible to produce such and other penicillins which could heretofore be produced by fermentative methods only with difficulty and/or only with a low yield or not at all.

In principle, the process according to the present invention consists in adding the above mentioned known precursors and other precursor compounds, such as 4-ethyl phenoxy acetic acid, 4-propyl phenoxy acetic acid, 4-tertiary butyl phenoxy acetic acid, 4-n-hexyl phenoxy acetic acid, 4-aceto phenoxy acetic acid, 4-acetylamino phenoxy acetic acid, 4-pentyl keto phenoxy acetic acid, 4-hydroxy phenoxy acetic acid, 4-ethoxy phenoxy acetic acid, 4-formyl phenoxy acetic acid, 4-nitro phenoxy acetic acid, 4-cyano phenoxy acetic acid, and 4-sulfo phenoxy acetic acid in the form of their acid halides. In general the halides of acids of the formula $$(R_2—X)_n—R_1—Z_2 \quad (II)$$

wherein $R_1$, $R_2$, $n$ and $X$ represent the same members and integers as indicated above, and
$Z_2$ represents a carboxyl group.

The addition of precursor should preferably extend over a considerable period of the fermentation time.

The aliphatic radical $R_1$ in Formulas I and II may be a straight chain or branched radical; it may have one or more double bonds in the straight chain and/or in the side chain. Moreover, the radical $R_1$ may carry one or more substituents. Examples of such substituents are alkyl or alkenyl radicals, amino alkyl, N-acylamino alkyl, amino groups, or hydroxyl groups, whereby said amino or hydroxyl groups may be substituted; aromatic radicals, such as phenyl and aralkyl radicals, which may also be substituted.

To obtain high yields, it is of advantage to begin with the addition of the precursor shortly after starting the fermentation process, preferably after the usual initial fermentation step. Fermentation should also advantageously be continued for 3 to 5 hours after the last addition of the precursor. Addition of the precursor according to the process of the present invention can be carried out intermittently by adding from time to time small amounts of the precursor. Preferably such addition is effected continuously. Should the pH-value decrease during fermentation, for instance, due to the use of an excessive amount of the acid halide precursor, which decrease would have a detrimental effect on the progress of the fermentation, suitable buffering agents or compounds of alkaline reaction are added to the nutrient solution in order to counteract said decrease in the pH-value. The buffering agents may initially be present in the fermentation solution or they may be added simultaneously with the precursor, but preferably at a place other than the place where the precursor is supplied. The amount of agents having a neutralizing action to be added is in general dependent on the amount of precursor.

Sodium bicarbonate or phosphate mixtures have proved to be particularly suitable as buffering agents, while solutions of alkali metal hydroxides, in particular of sodium hydroxide, can be used as compounds having a neutralizing effect.

Preferably, a pH-value in the physiological range is adjusted in the fermentation solution during the addition of the precursor, i.e. a pH-value between about 4.5 and about 8.5 and advantageously a pH-value between about 5.5 and about 7.5.

During fermentation, decomposition of excess precursor compound may occur. This is of advantage on subsequent extraction of the antibiotic.

When using, in the process according to the present invention, an acid halide containing an asymmetrical carbon atom as precursor, various isomers of such an acid halide may be employed. Ordinarily the racemate is employed as precursor, whereby the corresponding DL-penicillin or the two diastereoisomeric penicillins are obtained.

The acid halides used as precursors cause a considerable increase in the yield of the penicillin. They are also distinguished by their selective activity against bacteria. Inhibition of the growth of the mold could not be observed with the concentrations employed.

It has been found that there are differences in the suitability of various penicillium strains for use in the process according to the invention. Examples of particularly suitable penicillium strains are *Penicillium chrysogenum* Wis. Q-176 and *Penicillium chrysogenum* 51-20 and their mutants.

According to the present invention, the α-substituted acetic acids, for instance, phenoxy acetic acids, and in particular those acetic acids the α-carbon atom of which is of a tertiary character, are of particular importance inasmuch as penicillins with radicals of such acetic or phenoxy acetic acids could be produced by conventional fermentation methods only with difficulty or not at all. Examples of such acetic acids which are substituted in the α-carbon atom are (α-methyl) phenoxy acetic acid, (α-phenyl) phenoxy acetic acid, α-phenoxy stearic acid, N-acetyl tryptophan, and mandelic acid.

Other alkane or alkene carboxylic acids containing aromatic radicals with two or three substituents in the aromatic nucleus can also be used in the form of their halides. Examples of such compounds are di-substituted phenoxy acetic acid, such as 2,4-dichloro phenoxy acetic acid, 3,4-dichloro phenoxy acetic acid, 3-chloro-4-methyl phenoxy acetic acid, 4-chloro-3-methyl phenoxy acetic acid, 3-methyl-6-chloro phenoxy acetic acid, 3,4-dimethyl phenoxy acetic acid, 3,5-dimethyl phenoxy acetic acid, 2,4-dinitro phenoxy acetic acid, and trisubstituted phenoxy acetic acids, such as 4-chloro-3,5-dimethyl phenoxy acetic acid, and others.

Further examples of compounds which, employed in the form of their acid halides, can be incorporated into the penicillin molecule during fermentation are hydroxy acetic acids and other aliphatic carboxylic acids, such as ethoxy acetic acid, n-hexyloxy acetic acid, n-heptyloxy acetic acid, dichloro acetic acid, caproic acid, caprylic acid, capric acid, lauric acid, dipic acid, mercapto acetic acids, such as 2-methyl-4-hydroxy phenyl mercapto acetic acid, 3-methyl-4-hydroxy phenyl mercapto acetic acid, α-mercapto phenyl acetic acid, and 4-tolyl mercapto acetic acid, pyridyloxy acetic acid, β-naphthyloxy acetic acid, 4-hydroxy phenyl-α-thiopropionic acid, phenyl serine, benzyl sulfonic acid, 4-hydroxy cinnamic acid, 2,3-o-homoveratric acid, 3,4-o-homoveratric acid, and others.

According to a specific embodiment of the present invention the precursor compounds may be added during fermentation. Advantageously the precursor is added in the form of a solution in a non-toxic organic solvent. In this manner it is possible to keep the quantity of undesirable byproducts formed during the fermentation particularly low. Preferably esters, in particular ethyl acetate or amyl acetate, but also, for instance, chloroform and methyl isobutyl ketone, can be employed as organic solvents for the precursor compound. Advantageously, the ratio of precursor compound to organic solvent is between 1:1 and 1:20.

The following examples serve to illustrate the present invention without, however, limiting the same thereto.

A stock nutrient solution of the following composition was employed for carrying out the fermentation process described in the following examples:

| | Percent |
|---|---|
| $FeSO_4 \cdot 7H_2O$ | 0.01 |
| $H_3PO_4$ | 0.4 |
| $MnSO_4 \cdot H_2O$ | 0.025 |
| $CaCl_2$ | 0.01 |
| Lactose | 4.0 |
| Glucose | 1.0 |

The pH-value of the nutrient solution was adjusted to a pH of 6.0 by the addition of sodium hydroxide solution. Before inoculation, 1% of a 25% calcium carbonate suspension was added to the sterile nutrient solution.

*Example 1*

90 cc. of stock nutrient solution,
10 cc. of brewer's yeast autolysate, obtained, for instance, according to Austrian Patent No. 177,885, containing 20 g. of nitrogen per liter.
0.1% by volume of α-phenoxy propionic acid chloride (total quantity) added from the 72nd hour on at intervals of 12 hours,
1% of inoculating culture with spores of *Penicillium chrysogenum* strain 351.

Fermenting vessel: 2-liter Erlenmeyer flask on a circular shaking machine; speed: 240 r.p.m.; stroke, 30 mm.
Fermenting time: 168 hours.
Fermenting temperature: 24° C.
Penicillin content of fermentation filtrate (plate test against *Staphylococcus aureus* SG 511): 3200 u./cc.

Comparative fermentation was carried out without the addition of α-phenoxy propionic acid chloride. Otherwise the fermentation conditions were the same. After completion of the fermentation, an aliquot part of the mycelium was withdrawn. The resulting culture liquid was acylated with an excess of phenoxy propionic acid chloride in the presence of sodium bicarbonate; only 2900 u./cc. of penicillin were found by testing the culture liquid by the same test method.

*Example 2*

4750 cc. of stock nutrient solution,
250 cc. of corn steep liquor (with 40 g. of nitrogen per liter),
0.15% by volume of α-phenoxy propionic acid chloride (total quantity) added from the 36th hour on at intervals of 4 hours,
5% of mycelium inoculant of the strain *Penicillium chrysogenum* 351.

Fermenting vessel: 10-liter stainless steel fermenter; vortex system; 800 r.p.m.; 90 mm. disc stirrer,
Fermenting time: 108 hours.
Fermenting temperature: 24° C.
Penicillin content of fermentation filtrate: 1750 u./cc.

For working up, the fermentation mixture was filtered, yielding a liquid volume of 4.2 liters. This culture filtrate was extracted with 1.5 liters of butyl acetate at a pH-value of 2.0. The penicillin was re-extracted from the butyl acetate phase by means of an aqueous buffer solution of the pH of 7.0. Said buffer solution is preferably a mixture of primary and secondary alkali metal phosphates. The amounts of phosphates in said solution should not exceed an 0.025 molar concentration. After re-extracting the penicillin with 50 cc. of butyl acetate, a solution with a penicillin content of 119,000 u./cc. was obtained. The penicillin was precipitated by the addition of potassium acetate dissolved in methanol.

Yield: 3.3 g. of the potassium salt of α-phenoxy ethyl penicillin with 1480 u./mg. (iodometric test).

The precipitated potassium salt showed a decrease in activity of 10% after standing at a pH of 2.0 for one hour.

A comparative fermentation test was carried out in the same type of fermenter under the same conditions of fermentation without the addition of α-phenoxy propionic acid chloride. After completion of the fermentation, the mycelium was filtered off from an aliquot part of the fermentation culture. The filtrate was acylated with an excess of phenoxy propionic acid chloride in the presence of sodium bicarbonate; when tested according to the same test method, only 1500 u./cc. of penicillin were found.

Example 3

4250 cc. of stock nutrient solution
750 cc. of brewer's yeast autolysate (with 15 g. of nitrogen per liter),
0.12% by volume of α-phenoxy propionic acid chloride (total quantity) added continuously from the start of the fermentation on,
7% of mycelium inoculant of the strain *Penicillium chrysogenum* 1014.

Fermenting vessel: 10-liter stainless steel fermenter; vortex system; 800 r.p.m.; 90 mm. disc stirrer;
Fermenting time: 96 hours.
Fermenting temperatures: 24° C.
Penicillin content of fermentation filtrate: 2000 u./cc.

For working up, the culture solution was filtered. The filtrate was acidified to a pH of 2.5 to inactivate the natural penicillins, and allowed to stand for 1 hour at room temperature. After this time, the penicillin content of the solution was 1700 u./cc. 4 liters of the thus pretreated culture filtrate were extracted with 2 liters of butyl acetate. From the butyl acetate phase the penicillin was transferred into the aqueous phase with the addition of 500 cc. of sodium bicarbonate solution. The resulting aqueous bicarbonate solution was extracted with 70 cc. of butyl acetate after acidification to a pH-value of 2.0. The penicillin was precipitated from the butyl acetate phase by the addition of an 0.5-molar solution of potassium acetate in butanol. 3.34 g. of the potassium salt of α-phenoxy ethyl penicillin containing 1470 u./cc. were obtained (iodometric test).

To identify the penicillin, 1 g. of the resulting potassium salt was hydrolyzed with 5-molar hydrochloric acid. The precipitated α-phenoxy propionic acid had a melting point of 116–117° C. No depression was observed on melting a mixture of the precipitated product with synthetic α-phenoxy propionic acid (mixed melting point).

A comparative fermentation test was carried out in the same type of fermenter without the addition of α-phenoxy propionic acid chloride. After completion of the fermentation, the mycelium was filtered off from an aliquot part of the fermentation liquid, whereupon acylation was carried out with an excess of phenoxy propionic acid chloride in the presence of sodium bicarbonate. According to the same test method, only 1500 u./cc. of penicillin were found.

Example 4

4950 cc. of stock nutrient solution
150 g. of peanut cake (with 7% of nitrogen),
0.2% by volume of α-phenoxy propionic acid chloride (total quantity) added from the 24th hour on at intervals of 12 hours, whereby, however, the last two additions amount each to 0.05% by volume
5% of mycelium inoculant of the *Penicillium chrysogenum* strain 347.

Fermenting vessel: 10-liter stainless steel fermenter; vortex system; 650 r.p.m.; 90 mm. disc stirrer.
Fermenting time: 90 hours.
Fermenting temperature: 24° C.
Penicillin content of fermentation filtrate: 1650 u./cc. (iodometric test).

The fermentation solution was filtered off, yielding a liquid volume of 4.1 liters. The penicillin was extracted therefrom with one liter of methyl isobutyl ketone at a pH of 2.0. The penicillin was then transferred to an aqueous buffer solution of a pH of 7.2. From the buffer solution the penicillin was re-extracted with 40 cc. of butyl acetate, yielding a solution containing 120,000 u./cc. Penicillin was precipitated from said solution in the form of its potassium salt by the addition of an 0.7-molar solution of potassium acetate in ethanol. 2.86 g. of the potassium salt of α-phenoxy ethyl penicillin of an activity of 1450 units per mg., determined iodometrically, were isolated.

A comparative fermentation was carried out in the same type of fermenter under the same fermentation conditions but without the addition of α-phenoxy propionic acid chloride. After completion of the fermentation, the mycelium was separated from an aliquot part of the fermentation liquid. Acylation was then carried out with an excess of phenoxy propionic acid chloride in the presence of sodium bicarbonate. On testing the acylation mixture according to the same test method, only 1350 u./cc. of penicillin were found.

Example 5

900 liters of stock nutrient solution,
100 liters of yeast autolysate (with 20 g. of nitrogen per liter),
0.1% by volume of α-phenoxy propionic acid chloride (total quantity) added from the 48th hour on at intervals of 12 hours,
10% of mycelium inoculant of the *Penicillium chrysogenum* strain 1014
0.2% of sperm oil.

Fermenting vessel: 1500-liter stainless steel fermenter, baffleplate system, 450 r.p.m.; 0.6 liter of air per liter of nutrient solution per minute.
Fermenting time: 96 hours.
Fermenting temperature: 24° C.
Penicillin content of fermentation filtrate (iodometric test): 2200 u./cc.

For further working up, the crude culture was filtered. The resulting 900 liters of fermentation liquid were extracted by means of butyl acetate in the usual manner in five stages. 17.6 liters of butyl acetate solution with a penicillin content of 90,000 u./cc. were obtained. Precipitation of the penicillin was carried out by the addition of a 2.5-molar solution of potassium acetate in methanol. 805 g. of the potassium salt of α-phenoxy ethylene penicillin of an activity (iodometric test) of 1470 u./mg. were obtained. After incubation at a pH of 2.0 and room temperature for 1 hour, the potassium salt still showed 90% of the original activity.

A comparative fermentation was carried out in the same type of fermenter without the addition of α-phenoxy propionic acid chloride. After completion of the fermentation, the mycelium was separated from an aliquot part of the culture. The liquid freed from the mycelium was acylated with an excess of phenoxy propionic acid chloride in the presence of sodium bicarbonate. On testing the acylation mixture according to the same test method, only 1650 u./cc. of penicillin were found.

The procedure in the following examples is substantially the same as in the preceding examples.

Example 6

90 cc. of stock nutrient solution
10 cc. of brewer's yeast autolysate (with 20 g. of nitrogen per liter),
0.15% of phenoxy acetic acid chloride (total quantity) added from the 24th hour on at intervals of 12 hours,
1% of inoculating culture containing spores of the *Penicillium chrysogenum* strain 351.

Fermenting vessel: 2-liter Erlenmeyer flask on a circular shaking machine; speed: 240 r.p.m.; stroke, 30 mm.
Fermenting time: 170 hours.
Fermenting temperature: 24° C.
Penicillin content of fermentation filtrate (plate test against *Staphylococcus aureus* SG 511): 4600 u./cc.

Example 7

95 cc. of stock nutrient solution,
5 cc. of corn steep liquor (with 40 g. of nitrogen per liter),
0.12% of α-ethyl phenoxy acetic acid chloride (total quantity) added from the 48th hour on at intervals of 12 hours,
2% of inoculating culture containing spores of the *Penicillium chrysogenum* strain 351.

Fermenting vessel: 2-liter Erlenmeyer flask on a circular shaking machine; speed: 260 r.p.m.; stroke, 20 mm.
Fermenting time: 166 hours.
Fermenting temperature: 24° C.
Penicillin content of fermentation filtrate (plate test against *Staphylococcus aureus* SG 511): 2200 u./cc.

*Example 8*

4250 cc. of stock nutrient solution,
750 cc. of brewer's yeast autolysate (with 15 g. of nitrogen per liter),
0.14% of α-dimethyl phenoxy acetic acid chloride (total quantity) added from the 36th hour on at intervals of 6 hours,
5% of mycelium inoculant of the *Penicillium chrysogenum* strain 351.

Fermenting vessel: 10-liter stainless steel fermenter; vortex system; 800 r.p.m.; 90 mm. disc stirrer.
Fermenting time: 96 hours.
Fermenting temperature: 24° C.
Penicillin content of fermentation filtrate (iodometric test): 2000 u./cc.

*Example 9*

4950 cc. of stock nutrient solution,
150 g. of peanut oil cake (with 7% of nitrogen)
0.16% of o-cresoxy acetic acid chloride (total quantity) added continuously from the commencement of fermentation on
10% of mycelium inoculant of the *Penicillium chrysogenum* strain 347.

Fermenting vessel: 10-liter stainless steel fermenter; vortex system; 900 r.p.m.; 70 mm. disc stirrer.
Fermenting time: 100 hours.
Fermenting temperature: 24° C.
Penicillin content of fermentation filtrate (iodometric test): 1850 u./cc.

*Example 10*

4750 cc. of stock nutrient solution,
250 cc. of corn steep liquor (with 40 g. of nitrogen per liter),
0.10% of o-methoxy phenoxy acetic acid chloride (total quantity) added from the 48th hour on at intervals of 4 hours,
7% of mycelium inoculant of the *Penicillium chrysogenum* strain 1014.

Fermenting vessel: 10-liter stainless steel fermenter; vortex system; 800 r.p.m.; 80 mm. disc stirrer.
Fermenting time: 90 hours.
Fermenting temperature: 24° C.
Penicillin content of fermentation filtrate (iodometric test): 2800 u./cc.

*Example 11*

4500 cc. of stock nutrient solution
500 cc. of brewer's yeast autolysate (with 20. g. of nitrogen per liter),
0.12% of o-chloro phenoxy acetic acid chloride (total quantity) added from the 24th hour on at intervals of 12 hours,
15% of mycelium inoculant of the *Penicillium chrysogenum* strain 1014.

Fermenting vessel: 10-liter stainless steel fermenter; vortex system; 700 r.p.m.; 90 mm. disc stirrer.
Fermenting time: 108 hours.
Fermenting temperature: 24° C.
Penicillin content of fermentation filtrate (iodometric test): 1900 u./cc.

*Example 12*

4500 cc. of stock nutrient solution.
500 cc. of brewer's yeast autolysate (with 18 g. of nitrogen per liter),
0.15% of o-nitro phenoxy acetic acid chloride (total quantity) added from the 36th hour on at intervals of 8 hours,
10% of mycelium inoculant of the *Penicillium chrysogenum* strain 1014.

Fermenting vessel: 10-liter stainless steel fermenter; vortex system; 900 r.p.m.; 70 mm. disc stirrer.
Fermenting time: 96 hours.
Fermenting temperature: 24° C.
Penicillin content of fermentation filtrate (iodometric test): 2100 u./cc.

*Example 13*

16 liters of stock nutrient solution
500 g. of peanut oil cake (with 7% of nitrogen),
0.13% of isopropylidene amine hydroxy acetic acid chlo-

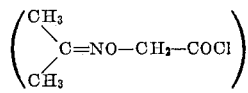

ride (total quantity) added from the 48th hour on at intervals of 12 hours,
5% of mycelium inoculant of the *Penicillium chrysogenum* strain 347,
0.1% of sperm oil.

Fermenting vessel: 20-liter stainless steel fermenter; baffleplate system; 400 r.p.m.; 0.5 liter of air per liter of nutrient solution per minute.
Fermenting time: 90 hours.
Fermenting temperature: 24° C.
Penicillin content of fermentation filtrate (iodometric test): 1600 u./cc.

*Example 14*

14.3 liters of stock nutrient solution,
700 cc. of corn steep liquor (with 45 g. of nitrogen per liter),
0.15% of p-cresoxy acetic acid chloride (total quantity) added from the 48th hour on at intervals of 6 hours,
10% of mycelium inoculant of the *Penicillium chrysogenum* strain 1014,
0.2% of sperm oil.

Fermenting vessel: 20-liter stainless steel fermenter; baffleplate system; 350 r.p.m.; 0.7 liter of air per liter of nutrient solution per minute.
Fermenting time: 96 hours.
Fermenting temperature: 24° C.
Penicillin content of fermentation filtrate (iodometric test): 3600 u./cc.

*Example 15*

15 liters of stock nutrient solution,
1500 cc. of brewer's yeast autolysate (with 22 g. of nitrogen per liter),
0.16% of phenyl mercapto acetic acid chloride (total quantity) added continuously from the commencement of fermentation on,
7% of mycelium inoculant of the *Penicillum chrysogenum* strain 1014,
0.3% of sperm oil.

Fermenting vessel: 20-liter stainless steel fermenter; baffleplate system; 450 r.p.m.; 0.6 liter of air per liter of nutrient solution per minute.
Fermenting time: 96 hours.
Fermenting temperature: 24° C.
Penicillin content of the fermentation filtrate (iodometric test): 4000 u./cc.

Example 16

900 liters of stock nutrient solution,
1000 liters of brewer's yeast autolysate (with 20 g. of nitrogen per liter),
0.2% of phenyl acetic acid chloride (total quantity) added from the 24th hour on at intervals of 12 hours,
10% of mycelium inoculant of the Penicillium chrysogenum strain 351,
0.2% of sperm oil.

Fermenting vessel: 1500-liter stainless steel fermenter; baffleplate system; 400 r.p.m.; 0.6 liter of air per liter of nutrient solution per minute.
Fermenting time: 100 hours.
Fermenting temperature: 24° C.
Penicillin content of the fermentation filtrate (iodometric test): 4500 u./cc.

Example 17

750 liters of stock nutrient solution,
150 liters of compressed yeast autolysate (with 15 g. of nitrogen per liter),
0.18% of ni-butoxy acetic acid chloride (total quantity) added from the 48th hour on at intervals of 6 hours,
7% of mycelium inoculant of the Penicillium chrysogenum strain 1014,
0.3% of sperm oil.

Fermenting vessel: 1500-liter stainless steel fermenter; baffleplate system; 400 r.p.m.; 0.5 liter of air per liter of nutrient solution per minute.
Fermenting time: 96 hours.
Fermenting temperature: 24° C.
Penicillin content of the fermentation filtrate (iodometric test): 3800 u./cc.

Example 18

1800 liters of stock nutrient solution,
200 liters of brewer's yeast autolysate (with 20 g. of nitrogen per liter),
0.15% by volume of α-phenoxy propionic acid chloride (total quantity) dissolved in four times its volume of ethyl acetate, added from the 48th hour on at intervals of 12 hours
10% of mycelium inoculant of the Penicillium chysogenum strain 1014,
0.2% of sperm oil.

Fermenting vessel: 3000 liter stainless steel fermenter; baffleplate system; 400 r.p.m.; 0.75 liter of air per liter of nutrient solution per minute.
Fermenting time: 90 hours.
Fermenting temperature: 24° C.
Penicillin content of the fermentation filtrate (iodometric test): 2500 u./cc.

Example 19

950 litres of stock nutrient solution
50 litres of corn steep liquor (with 40 g. of nitrogen per litre)
0.22% phenylmercapto acetic acid chloride (total quantity) added from the 36th hour on at intervals of 12 hours
5% of mycelium inoculant of the Penicillium chrysogenum strain 351.

Fermenting vessel: 1500 litre stainless steel fermenter, baffleplate system; 450 r.p.m.; 0.5 litre of air per litre nutrient solution per minute.
Fermenting time: 104 hours.
Fermenting temperature. 24° C.
Penicillin content of the fermentation filtrate (iodometric test). 4000 u./cc.

Example 20

900 liters of stock nutrient solution
100 liters of brewer's yeast autolysate (with 22 g. of nitrogen per liter)
0.18% of a α-phenoxy propionic acid chloride (total quantity) added from the 12th hour on at intervals of 10 hours
7.5% of mycelium inoculant of the strain Penicillium chrysogenum 1014
03% of sperm oil.

Fermenting vessel: 1500-liters stainless steel fermenter, baffleplate system; 350 r.p.m.; 0.7 liter of air per liter of nutrient solution per minute.
Fermenting time: 115 hours.
Fermenting temperature: 27° C.
Penicillin content of fermentation filtrate (iodometric test): 3500 u./cc.

Example 21

1000 liters of stock nutrient solution
200 liters of compressed yeast autolysate (with 16 g. of nitrogen per liter)
0.25% cyclohexyl acetic acid chloride (total quantity) added from the 30th hour on at intervals of 8 hours
10% of mycelium inoculant of the Penicillium chrysogenum strain 1014
0.4% of sperm oil.

Fermenting vessel: 1500-liters stainless steel fermenter, baffleplate system; 300 r.p.m.; 0.8 liter of air per liter of nutrient solution per minute.
Fermenting time: 90 hours.
Fermenting temperature: 26° C.
Penicillin content of fermentation filtrate (iodometric test): 3200 u./cc.

The following penicillins have been prepared according to the proceeding of the preceding examples:

Isopropylidene aminoxy methylpenicillin
o-Cresoxy methylpenicillin
α-Phenoxy propylpenicillin
α-[p-Cresoxy]-ethyl penicillin
α-[o-Cresoxy]-ethyl penicillin
α-Phenoxy pentylpenicillin
α-Phenoxy isobutyl penicillin
o-Methoxy phenoxy methylpenicillin
α-Phenylmercapto ethyl penicillin
o-Nitrophenoxy methylpenicillin
Phenyl phenoxy methylpenicillin
α-Phenoxy isopropylidene penicillin
p-Nitrobenzyl penicillin
2,4-dichloro phenoxy methylpenicillin
Hydrochinon-O,O-dipropionamido penicillanic acid
Hydrochinon-O,O-diacetamido penicillanic acid
1,3-pentadienyl penicillin
α-Naphthoxy methylpenicillin
α-Methylbenzyl penicillin
ω-Phenoxy-β-bromo ethylene penicillin
Diphenyl methylpenicillin
α-Cyano benzylpenicillin
10-decylene penicillin
α-Phenoxy cinnamoyl penicillanic acid
Pentadecyl penicillin
α-thymoxy ethyl penicillin
α-thymoxy methylpenicillin
Phenylmercapto cyclohexyl methyl penicillin
α-Phenyl propyl penicillin
α-Phenoxy-β-phenyl ethyl penicillin
Phenoxy cyclohexyl methylpenicillin
α,β-Diphenyl ethyl penicillin It is a further object of the present invention to prepare mixtures of penicillins in a simple and economical manner, at least one component thereof being an acidstable penicillin, e.g. one of those penicillins, which have been defined in greater detail in the Austrian patent specification No. 178,692. Mixtures of penicillin salts, at least one salt of which is derived from an acid-stable penicillin, have acquired importance due to their synergistic effects. It has now been found that such mixtures of penicillins or their salts can conveniently be prepared according to the process of the invention in a simple and economical way by a fermentation, in such a way, that at least one part of the fermentation is carried out in the presence of at least two different precursor compounds, at least one of which is a halide of acids of the general Formula II.

Thus, in this embodiment of the process according to the invention precursor compounds for at least two penicillins are simultaneously present in one and the same fermentation vessel. If the fermentation is carried out in such a way, one obtains surprisingly an increased total yield of penicillin, when compared to a similar fermentation charge, to which only one single precursor compound has been added, either, as has been conventional hitherto, e.g. in the form of an alcohol or of an acid, such as phenoxyethanol or phenoxyacetic acid, or in the form of a reactive derivative of an acid, such as α-methylphenoxy acetyl chloride. In such a fermentation according to the invention, in which, e.g. two precursor compounds are simultaneously added, these precursor compounds may be two reactive derivatives of different carboxylic acids, for example of phenoxyacetic acid and of α-methylphenoxy acetic acid, e.g. phenoxyacetyl chloride and α-methylphenoxy acetyl chloride. It is particularly advantageous to conduct the fermentation employing simultaneously one precursor of the type of carboxylic acids and one precursor of the type of the reactive derivatives of carboxylic acids. The procedure can for example be conducted in such a way, that at first at least one carboxylic acid, e.g. phenoxyacetic acid, is added in insufficient amounts, i.e. in amounts not making use of the full capacity of the fungus. In the further course of the fermentation at least one reactive derivative such as an acid chloride, of a carboxylic acid different from the added acid, such as phenoxyacetic acid, as for example α-methylphenoxy acetyl chloride, can be added continuously or intermittently.

*Example 22 (Mixed Fermentation)*

1800 liters of stock nutrient solution
250 liters of brewer's yeast autolysate (with 20 g. nitrogen per liter),
0.065% of sodium phenoxyacetate (sterilized together with the nutrient solution)
0.18% α-phenoxy propionic acid chloride (total quantity) added from the 48th hour on at intervals of 12 hours
10% of mycelium inoculant of the *Penicillium chrysogenum* strain 1014
0.25% of sperm oil.

Fermenting vessel: 2500-liter stainless steel fermenter; baffle-plate system; 300 r.p.m.; 1 liter of air per liter of nutrient solution per minute.
Fermenting time: 105 hours.
Fermenting temperature: 24° C.
Penicillin content of the fermentation filtrate (iodometric test): 4000 u./cc.

From the total quantity of penicillin amounting 4000 u./cc. falls to phenoxymethyl penicillin 2400 u./cc. and to α-methylphenoxymethyl penicillin 1600 u./cc., as determined analytically.

Comparative fermentations were carried out, in one case without the addition of the 0.065% sodium phenoxy acetate and in the other case without the addition of the 0.18% α-phenoxy propionic acid chloride. Otherwise, the fermentation conditions were the same. After completion of the fermentations were obtained in the first case 1800 u./cc. (α-methyl)-phenoxy methyl penicillin and in the second case 5000 u./cc. phenoxy methyl penicillin.

The total yield of two fermentations according to example 22 amounts therefore 8000 u./cc., whilst separate fermentations for the production of phenoxy methyl penicillin or (α-methyl)-phenoxy methyl penicillin respectively by the same fermentation conditions give 5000 u./cc. or 1800 u./cc. respectively. The use of two different precursors in one and the same fermentation gives therefore in two runs an increase in yield of 1200 u./cc.

In place of the acid chlorides used in the preceding examples, there may be employed other acid halogenides, such as the acid bromides. However, the acid chlorides are the preferred reactants.

Of course, many changes and variations in the reactants, the fermentation conditions, temperature, dilution, duration, in the methods of working up the fermentation mixtures, and of isolating and purifying the penicillins contained therein, and the like may be made by those skilled in the art in accordance with the principles set forth herein and in the claims annexed hereto.

In general, the process according to the present invention is applicable in the production of all penicillins carrying acyl radicals at their amino group and corresponding to the following Formula III:

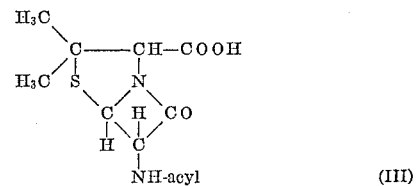

It is understood, of course, that the acid halides mentioned hereinabove are the preferred acid halides.

We claim:
1. In a process of producing, by fermentation, penicillins of the formula

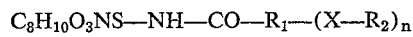

wherein

R₁ is a bivalent, unsubstituted, saturated aliphatic radical;
X is a member selected from the group consisting of oxygen, sulfur, and a direct linkage between R₁ and R₂;
R₂ is an organic radical selected from the group consisting of an unsubstituted aliphatic, cycloaliphatic, and aromatic radical and a substituted aliphatic, cycloaliphatic, and aromatic radical; and
n is one of the integers 1 and 2, the step which comprises adding the halide of an acid of the formula

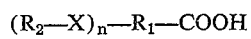

wherein R₁, X, R₂ and n represent the same members and integers as indicated above, to the fermentation mixture during cultivation of a penicillin-producing microorganism on a culture medium supporting the growth of such a microorganism.

2. The process according to claim 1, wherein the acid halide added during fermentation is the halide of an α-substituted acetic acid.

3. The process according to claim 2, wherein the halide of an α-substituted acetic acid is the halide of such an α-substituted acetic acid having a tertiary carbon atom in α-position.

4. The process according to claim 1, wherein the acid halide added during fermentation is the halide of phenyl acetic acid.

5. The process according to claim 1, wherein the acid halide added during fermentation is the halide of a phenoxy acetic acid.

6. The process according to claim 5, wherein the acid halide added during fermentation is the halide of α-methyl phenoxy acetic acid.

7. The process according to claim 1, wherein the acid halide added during fermentation is the acid chloride.

8. The process according to claim 1, wherein addition of the acid halide during fermentation is completed at least 3 hours before termination of the fermentation.

9. The process according to claim 1, wherein the addition of the acid halide is started after a short preliminary fermentation period.

10. The process according to claim 1, wherein the acid halide is added in small portions during fermentation.

11. The process according to claim 1, wherein the acid halide is added gradually and continuously during fermentation.

12. The process according to claim 1, wherein the acid halide and, simultaneously, a neutralizing agent are added to the fermentation mixture to prevent decrease of the pH-value of the fermentation mixture.

13. The process according to claim 12, wherein the neutralizing agent is an agent selected from the group consisting of an alkali metal bicarbonate and a buffering alkali metal phosphate mixture.

14. The process according to claim 12, wherein the neutralizing agent is an alkali metal hydroxide.

15. The process according to claim 1, wherein the acid halide is added to the fermentation mixture in the form of its solution in an organic solvent substantially non-toxic to the fermentation mixture.

16. The process according to claim 15, wherein the organic solvent for dissolving the acid halide is a lower alkyl ester of acetic acid.

17. The process according to claim 1, wherein fermentation is carried out in the presence of phenoxy acetic acid with the addition of α-methyl phenoxy acetyl chloride.

18. In a process of producing a penicillin by cultivating a penicillin-producing microorganism on a culture medium supporting the growth of such a microorganism, the step which comprises adding, as precursor, the acid halogenide of an acid of the formula $$(R_2-X)_n-R_1-COOH$$

wherein $R_1$ is a bivalent alkyl hydrocarbon radical;
X is a member selected from the group consisting of oxygen, sulfur, and a direct linkage between $R_1$ and $R_2$;
$R_2$ is a member selected from the group consisting of an unsubstituted aliphatic, cycloaliphatic, and aromatic hydrocarbon radical and a substituted aliphatic, cycloaliphatic, and aromatic hydrocarbon radical; and
$n$ is one of the integers 1 and 2;

to the culture medium during cultivation.

References Cited in the file of this patent
UNITED STATES PATENTS
2,479,297    Behrens et al. _____ Aug. 16, 1949